US012149894B2

(12) United States Patent
Dittli et al.

(10) Patent No.: US 12,149,894 B2
(45) Date of Patent: Nov. 19, 2024

(54) HEARING DEVICE PLUG CONNECTOR AND HEARING DEVICE

(71) Applicant: SONOVA AG, Staefa (CH)

(72) Inventors: Erich Dittli, Reichenburg (CH); Katja Dietrich, Jona (CH); Jonas Meyer, Stäfa (CH)

(73) Assignee: Sonova AG, Staefa (CH)

( * ) Notice: Subject to any disclaimer, the term of this patent is extended or adjusted under 35 U.S.C. 154(b) by 0 days.

(21) Appl. No.: 17/942,751

(22) Filed: Sep. 12, 2022

(65) Prior Publication Data

US 2023/0098589 A1 Mar. 30, 2023

(30) Foreign Application Priority Data

Sep. 27, 2021 (EP) .................................... 21199131

(51) Int. Cl.

| | |
|---|---|
| ***H01R 13/639*** | (2006.01) |
| ***H04R 1/10*** | (2006.01) |
| ***H04R 25/00*** | (2006.01) |

(52) U.S. Cl.

CPC ......... *H04R 25/609* (2019.05); *H01R 13/639* (2013.01); *H04R 1/1025* (2013.01); *H04R 25/65* (2013.01); *H04R 2225/31* (2013.01)

(58) Field of Classification Search

CPC .... H04R 25/609; H04R 1/1025; H04R 25/65; H04R 2225/31; H01R 13/639

(Continued)

(56) References Cited

U.S. PATENT DOCUMENTS

| | | | |
|---|---|---|---|
| 5,188,540 | A | 2/1993 | Haertl et al. |
| 7,684,579 | B2 | 3/2010 | Ochsenbein et al. |

(Continued)

FOREIGN PATENT DOCUMENTS

| | | | |
|---|---|---|---|
| DE | 102013225429 | A1 | 6/2015 |
| DE | 102019203382 | A1 | 9/2020 |

(Continued)

OTHER PUBLICATIONS

"Extended European Search Report received in EP Application No. 21199131.0 on Mar. 21, 2022".

*Primary Examiner* — George C Monikang
(74) *Attorney, Agent, or Firm* — ALG Intellectual Property, LLC

(57) ABSTRACT

A hearing device plug connector may include a first connector component and a second connector component, wherein the hearing device plug connector includes a latching mechanism for securing the first connector component and the second connector component against unintended disconnection, wherein the latching mechanism includes a catch and a complementary latch component which are in latching engagement when the first connector component and the second connector component are connected, wherein the catch is moveable against a spring force from a latching position into a release position when connecting or disconnecting the first connector component and the second connector component, and wherein in the latching position the catch can engage with the complementary latch component and in the release position the catch can disengage from the complementary latch component. The hearing device plug connector may further include a sealing element for providing a seal between the first and second connector components.

14 Claims, 5 Drawing Sheets

(58) Field of Classification Search
USPC ................ 381/312, 322, 324, 328, 329, 330
See application file for complete search history.

(56) References Cited

U.S. PATENT DOCUMENTS

| | | | | |
|---|---|---|---|---|
| 9,049,526 | B2 | 6/2015 | Higgins | |
| 9,143,874 | B2 | 9/2015 | Angst et al. | |
| 9,247,360 | B2 | 1/2016 | Barth et al. | |
| 10,715,938 | B2 * | 7/2020 | Kirchhoff | H01R 13/62 |
| 2006/0159298 | A1 | 7/2006 | Von et al. | |
| 2009/0074218 | A1 | 3/2009 | Higgins | |
| 2012/0063621 | A1 | 3/2012 | Naumann | |
| 2013/0004005 | A1 * | 1/2013 | Barth | H04R 25/607 381/322 |
| 2014/0003638 | A1 | 1/2014 | Barth et al. | |
| 2016/0227334 | A1 | 8/2016 | Johansen | |

FOREIGN PATENT DOCUMENTS

| | | | |
|---|---|---|---|
| EP | 0806885 | B1 | 10/2001 |
| EP | 1681904 | A1 | 7/2006 |
| EP | 2040343 | A1 | 3/2009 |
| EP | 2908559 | B1 | 10/2016 |
| EP | 3422739 | A1 | 1/2019 |

* cited by examiner

HEARING DEVICE PLUG CONNECTOR AND HEARING DEVICE

RELATED APPLICATIONS

The present application claims priority to EP Patent Application No. EP21199131, filed Sep. 27, 2021, the contents of which are hereby incorporated by reference in their entirety.

BACKGROUND INFORMATION

A hearing device herein is to be understood as any device outputting sound that includes components that are worn in the vicinity of, on, or directly in an ear of a person. In particular, hearing devices include hearing aids which are used to supply a hearing-impaired person with processed acoustic ambient signals. The processing typically comprises at least amplification so as to compensate for and/or treat the specific hearing impairment of the person. Such hearing aids generally comprise at least one microphone which has the function of an electroacoustic input transducer, at least one speaker which is generally referred to as 'receiver' and which has the function of an electroacoustic output transducer, and an electronic signal processing unit which is connected to said microphone and said speaker. The electronic processing unit processes electronic input signals from the at least one microphone and provides processed output signals to the receiver. The electronic processing unit may comprise analog and/or digital signal processing elements. Said processing elements are generally arranged within a housing, case or shell of the hearing device. Their function can include amplification, noise reduction, tone control, sound classification, and filtering, etc. The necessary electrical power for the processing is generally supplied by a battery located in the housing of the hearing aid. The electronic components of the hearing aid are usually arranged on a printed circuit board and/or are connected thereto.

In relation to their application and user indication and according to the corresponding main solutions available on the market, such hearing devices can be worn, for instance, behind-the-ear (BTE), in-the-ear (ITE) or completely-in-ear (CIC). Latest design developments have even made available hearing devices that are smaller than CIC devices which are worn deep in the auditory canal of the ear and are generally referred to as invisible-in-canal (IIC) devices.

A broad class of hearing devices comprises two components, in particular a BTE-component comprising e.g. a main housing or shell that is worn behind the ear, and an ITE-component comprising e.g. an earpiece which is positioned in the auditory canal of the user. The two components e.g. can be connected by a connecting flexible sound tube for routing acoustic output signals from a receiver located in the BTE-component to the earpiece in the auditory canal. In other cases, the receiver is located in an earpiece of the ITE-component. In such cases, the BTE-component is connected to the ITE-component by a cable comprising electrical lines for routing electrical signals from the BTE-component to the receiver in the earpiece. Such hearing devices are generally referred to as receiver-in-canal behind-the-ear (RIC BTE) devices or sometimes short just as RIC devices.

The tube or cable of the ITE-component and the BTE-component of the hearing device are generally connected by way of a plug connector which has the function of providing electrical and/or other connections as well as ensuring a mechanical hold between the BTE-component and the cable. As the plug connector typically is exposed to ambient influences and is prone to the ingress of e.g. sweat or earwax, the plug connector may be protected against contamination by a seal.

It is well known in the art to include simple snap-fit mechanisms for such plug connectors in order to provide for a mechanical hold of the plug-in connection. Such simple snap-fit mechanisms, however, often do not provide for well-defined pull-out forces or sufficiently secure the connection against unintended unplugging. In particular, such simple mechanisms tend to wear out rather quickly and result in deteriorating pull-out threshold forces.

Other mechanisms for securing plug connectors of hearing devices comprise separate locking elements as e.g. pins or pegs that are inserted and engage with one or more components of the plug connector in order to lock them in place. A corresponding locking mechanism is described in e.g. EP 2 040 343 A1 which relates to a hearing assistance device having a housing and a plug providing for mechanical and electrical connection to the housing. The plug can be inserted into a receptacle of the housing. An insertable locking member has two teeth which engage in grooves of the plug when the locking member is snapped into place and the plug sits in the receptacle.

DE 10 2019 203 382 A1 describes a hearing device including a plug connector for connecting an earpiece to a housing via a connecting tube. The plug connector includes a spring loaded latching element which secures a plug component against unintended pull-out of a receptacle once inserted. It is suggested that the latching element needs to be manually released in order to disconnect the plug component.

US 2014/0003638 A1 describes a hearing instrument having a housing to which a tube can be detachably connected by means of a connector. The connector comprises a plug that can be placed in an opening of the housing in a two part movement. An elastically mounted bolt is provided in the opening which engages with lugs of the plug when the plug-in connection is closed. The plug comprises a seal that protects electrical connections of the connector against moisture and dirt.

The hearing device plug connectors of the prior art are often not sufficiently secured against unintended disconnection and do not provide for pull-out threshold forces that allow for safe and reliable use of the hearing device. In the case of simple snap-fit mechanisms, the pull-out threshold forces are often too weak or deteriorate over time which can lead to unintended disconnection. Spring loaded latching mechanisms may offer safer and more reliable pull-out threshold forces, but generally have a rather complicated constructive design and handling may be difficult, in particular e.g. in the case where dexterity may be impaired. In the case of locking mechanisms, the connector can usually not be disconnected at all when the locking mechanism is engaged which may lead to failure or breakage of cables or other components of the hearing device when exceedingly high pull-out forces are applied. Locking mechanisms also often include separate locking elements which need to be inserted into the hearing device through a separate outside opening in order to secure the plug connector. Such openings, however, form an additional potential source of contamination by moisture or dust ingress.

BRIEF DESCRIPTION OF THE DRAWINGS

The embodiments described herein are further illustrated by way of exemplary specific implementations which are described in detail below and which are shown in the accompanying figures. The figures show schematically.

Figure 1A:
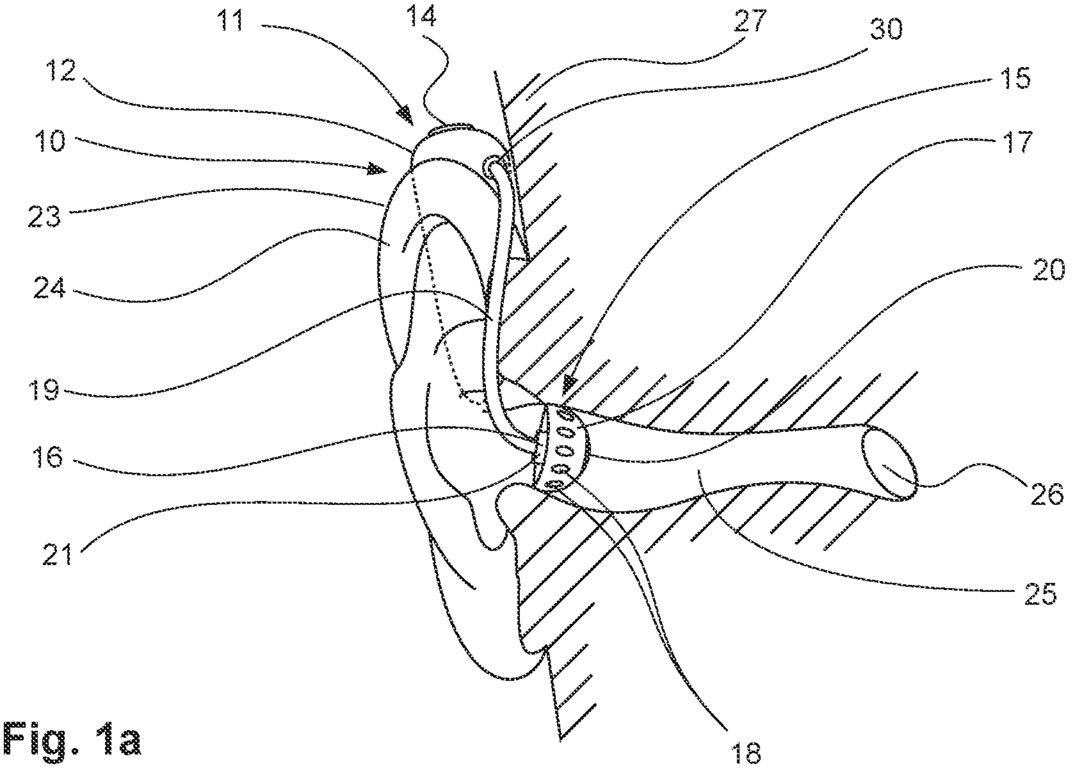
FIG. 1*a*: a hearing aid including a behind-the-ear (BTE) component and an in-the-ear (ITE) component comprising a cable which connects to the BTE-component via a hearing device plug connector as it is worn by a user in a partial cross-sectional view.

The figures are not drawn to scale and have various viewpoints and perspectives. Corresponding parts or components are generally referred to by the same reference numerals. The invention shall not be limited to the particular implementations and is intended to cover modifications, equivalents, and alternatives falling within the scope of the invention as it is defined by the claims.

DETAILED DESCRIPTION

Described herein is a hearing device plug connector that allows for a safe and reliable connection between components of a hearing device, wherein the connection has a simple and compact constructive design while being easy to handle.

A hearing device plug connector as described herein may comprise a first connector component and a second connector component which are detachably connectable. The hearing device plug connector includes a latching mechanism for securing the first connector component and the second connector component against unintended disconnection. The latching mechanism includes a catch and a complementary latch component which are in latching engagement when the first and the second connector component are connected. Thereby, the catch is moveable against a spring force from a latching position into a release position when connecting or disconnecting the first and the second connector component. In the latching position, the catch can engage with the complementary latch component and in the release position, the catch can disengage from the complementary latch component. The hearing device plug connector further comprises a sealing element for providing a seal between the first and the second connector component for protection against contamination of the plug hearing device connector.

In some embodiments, a hearing device plug connector comprises a first connector component and a second connector component which are detachably connectable. The hearing device plug connector includes a latching mechanism for securing the first connector component and the second connector component against unintended disconnection. The latching mechanism includes a catch and a complementary latch component which are in latching engagement when the first and the second connector component are connected. Thereby, the catch is moveable against a spring force from a latching position into a release position when connecting or disconnecting the first and the second connector component. In the latching position, the catch can engage with the complementary latch component and in the release position, the catch can disengage from the complementary latch component. The hearing device plug connector further comprises a sealing element for providing a seal between the first and the second connector component for protection against contamination of the hearing device plug connector. In some embodiments, the sealing element includes a resilient material and said resilient material provides said catch with said spring force.

The hearing device plug connector can be used for detachably connecting two components of a hearing device as e.g. connecting an ITE-component to a BTE-component of a hearing device. The hearing device plug connector can e.g. be arranged between a cable of the ITE-component and a housing of the BTE-component. A single hearing device can have more than one hearing device plug connectors in some embodiments, for instance, when a cable on the one hand is connected via one hearing device plug connector to a BTE-component and on the other hand via another hearing device plug connector to an earpiece of the ITE-component of the same hearing device.

In some embodiments, the first and the second connector component are detachably connectable, i.e. can be reversibly connected and disconnected multiple times. The hearing device plug connector can be connected or disconnected by a user of the hearing device or by a technician e.g. in case of replacement of components, cleaning or maintenance. The first and the second connector component can be a plug component and a socket component, respectively, or vice versa. The plug component is often also referred to as male connector component whereas the socket component is often referred to as female connector component. The socket component here refers to a component having a receptacle for receiving at least a section of the plug component. An unintended disconnection of the hearing device plug connector refers to unwanted pull-out events which may happen when e.g. a user accidentally pulls on one of the components of the hearing device that are connected by the hearing device plug connector as e.g. a cable, resulting in disconnecting the first and the second connector component. In contrast, an intended disconnection can occur in case of e.g. maintenance of a hearing device comprising the hearing device plug connector.

The latching mechanism includes the catch and the complementary latch component. The catch and the complementary latch component each form a part of the first and the second connector component, respectively, which are to be latched with respect to each other. The catch and the complementary latch component are configured and arranged with respect to each other in such a way that they come into the latching engagement when the hearing device plug connector is connected or, in other words, plugged-in.

When the hearing device plug connector is in a fully plugged-in state, the catch is in the latching position and engages the complementary latch component in the latching engagement.

The release position of the catch refers to a position which is usually only temporarily reached during the connecting or disconnecting of the hearing device plug connector or, in other words, during the plugging or unplugging of the plug connector. In the release position, the catch can be brought into the latching engagement with the complementary latch component or can be brought out of the latching engagement.

In some examples, and in favor of a simplified construction, the catch is also in the latching position when the hearing device plug connector is in a disconnected state, i.e. in an unplugged state. The spring force provided by the resilient material of the sealing element can thereby retain the catch in the latching position which, in the case of an unplugged state, is also referred to as a resting position. The catch may rest against a stop element in the resting position, e.g., loaded with the spring force, wherein the stop element is configured as a limiter for the range of motion of the catch in the direction of the direction of the spring force.

The latching mechanism may be configured in such a manner that a pull-out force needed to unplug the hearing device plug connector has to exceed a threshold force which is established by the latching mechanism. The threshold value of the pull-out force can be adjusted by e.g. the spring force provided by the resilient material of the sealing element (see also below). The threshold value of the pull-out force may be adjusted to such an amount that the first and the second connector component is secured against unintended disconnection but still allows for a safe disconnection by a user in case of an intended disconnection. The pull-out force may be provided such that simply pulling the first and the second connector component with respect to each other with a pull-out force exceeding the threshold pull-out force causes the latching mechanism to disengage. Further factors that may contribute to the threshold value of the pull-out force include e.g. the geometrical design or material properties of the interacting areas of the catch and the complementary latch component as well as e.g. how the catch is mounted and, for instance, in case of an articulated mount, the length of a lever arm of the catch.

The latching mechanism of the hearing device plug connector in some embodiments has the advantage that it can be fully encapsulated inside the plug connector itself. In particular, there is no need to provide any access from the outside, i.e. there is no need for a control element or a locking element as e.g. a locking pin or any other additional access point that needs to be accessible from the outside for disengaging the latching mechanism. As such, a potential source for contamination of the interior of the hearing device by pollutants as moisture or dust can be eliminated as no additional openings are required. However, it shall not be excluded that an additional locking mechanism can still be advantageous which allows for additional fixation of the latched connection should such fixation be desired.

The catch is provided with the spring force by being operatively connected or coupled to the resilient material of the sealing element. The resilient material of the sealing element thus functions as a spring element. The spring force provided by the resilient material of the sealing element provides for a return force which restores the catch from the release position to the latching or resting position. To this end, the catch is configured in such a manner that it can compress and/or stretch the resilient material of the sealing material when being moved out of the latching or resting position toward the release position. The spring force resulting from the compression or stretching of the resilient material acts on the catch, i.e. provides it with a spring load. The operative connection or coupling can be direct or indirect, wherein generally a direct operative connection may be desirable as it may offer a simpler and more compact construction with less parts. As such, the sealing element provides for a well-defined spring force which acts on the catch which in turn allows for a reproducible pull-out force of the hearing device plug connector.

In some examples, the catch and the sealing element are operatively connected at all times, i.e. in a plugged and in an unplugged state of the hearing device plug connector as well as in intermediate transitional states. However, dependent on the specific requirements, other embodiments can be provided in which said operative connection between the catch and the resilient material of the sealing element is not established before connecting the first and the second connector component.

The sealing element can be formed from the resilient material as a whole or only in part. For instance, a section of the sealing element can be made of a resilient material whereas other sections can be made of a non-resilient material. In some embodiments, at least the section of the sealing element which is operatively connected to the catch is made from the resilient material.

The sealing element in its function as a seal or gasket typically closes a gap between the first and the second connector component in order to seal the hearing device plug connector against contamination from the outside. The sealing element may form a continuous barrier preventing liquid or solid contaminants from getting between the first and the second connector component when they are in a plugged-in state.

The sealing element of the hearing device plug connector in some embodiments thus does not only protect the plug connection against contamination. The embodiments described herein may use the sealing element in an unexpected and advantageous additional function as a spring element which provides the catch of the latching mechanism with a spring force. This double function of the sealing element allows for a simple and compact constructive design of the hearing device plug connector while providing a well-defined pull-out threshold force. The hearing device plug connector in some embodiments thus provides for a safe and reliable connection between two components of a hearing device which has a simple and compact construction and is easy to handle.

In some examples, the latching mechanism is configured in such a manner that a first threshold force needs to be overcome when connecting the first and the second connector component, i.e. when plugging-in the hearing device plug connector in a plugging direction. In some examples, a second threshold force needs to be overcome when disconnecting the first and the second connector component, i.e. when unplugging the hearing device plug connector in a direction opposite to the plugging direction. Typically, the first threshold force may be be lower than the second threshold force as the connection shall be easy to establish whereas the hearing device plug connector shall be reasonably well secured against unintended disconnection, i.e. unintended pull-out. The plugging direction is thereby determined by the direction in which the first and the second connector component are to be moved with respect to each other in order to connect the first and the second plug component.

The hearing device plug connector may be configured in such a manner that the pull-out threshold force is lower than a typical force at which e.g. a connecting cable fails and/or breaks. A typical value of a tension force at which commonly used cables fail was found to be at around 14 N. In order to prevent breakage of the cable, the effective pull-out threshold force of the plug connector should therefore not be larger than 11 N, taking into account a safety margin of 3 N. However, as it rarely occurs in practice that an unintended or intended pull-out force is exactly directed opposite to the plugging direction, the effective pull-out force acting on the cable may be significantly larger than the straight pull-out threshold force. As such, it has been found that the straight pull-out threshold force should not exceed a value of 6 N in order to ensure that the effective pull-out force of 11 N is not exceeded up to a pull-out angle of 15 degrees with respect to the plugging direction. As a lower limit, in order to sufficiently secure the hearing device plug connector against unintended pull-outs, it has been found that the pull-out threshold force should not be lower than 5 N. Otherwise, it could happen that the hearing device plug connector is disconnected by regular forces occurring during daily use. The straight pull-out threshold force may thus lie in a range from 5 N to 6 N, e.g., from 5.5 N to 6 N.

It has been found that silicone is an example material for the resilient material of the sealing element as silicone exhibits a high resistance against sweat, ear wax and other contaminants to which a hearing device may be exposed during daily use. In particular, it has been found that silicone with a shore-A value of equal or larger than 60 has sufficient resilience for the present application while, at the same time, providing good sealing properties. This is particularly the case when the sealing element is entirely formed from the resilient material. In some examples, the shore-A value lies in the range from 60 to 80 as higher values than 80 were found to be too hard and exhibit too little resilience.

In an embodiment, the first connector component and the second connector component each comprise a connection, said connections being connected when the first and the second connector component are connected. The connections hereby refer to matching e.g. electrical connections, optical connections, pneumatic connections or a sound port for connecting an acoustic duct to the sound port. In some examples, in particular in an RIC hearing device, said connections are electrical connections. The connections in this case each comprise e.g. a contact element or a terminal which come into electrically conducting contact when the first connector component is connected to the second connector component or, in other words when the plug connection is established. The connections are typically complementary terminals as e.g. a pin and a socket. However, other types of matching contact terminals for establishing an electrically conducting connection can also be used.

In a particularly embodiment, the first connector component and the second connector component each comprise three electrical connections, said three connections of the first connector component being individually connected to the three connections of the second connector component when the first and the second connector component are connected, i.e. when the hearing device plug connector is fully plugged in. The three connections allow for electrical connections for a neutral and a live line as well as an additional earth line. In certain embodiments, the first and the second connector component each comprise a combination of electrical connections, optical connections, pneumatic connections and/or sound ports.

In particular, in the case when the hearing device plug connector is used for connecting a cable of an ITE-component with a BTE-component. The term 'cable' herein is understood to include a cable with electrical lines for transmitting electrical signals but can also refer to a simple flexible tube including an acoustic channel for routing acoustic signals. A cable in the present sense can also be a hybrid cable including electrical lines and e.g. an acoustic channel and/or a pressure line for inflating or deflating e.g. inflatable earpieces or pneumatically controllable valves of an earpiece. In addition to transmitting electrical signals, acoustic signals and/or expansion media, the cable can also comprise e.g. air lines for venting purposes or optical fibers for optical signal transmission. As such, if not stated otherwise, the cable described herein can be a simple sound tube and/or can comprise electrical lines, sound lines, pressure lines, optical or other signal lines, each individually or in different combinations according to the requirements, construction and/or working principle of the specific hearing device. It becomes immediately apparent that the hearing device plug connector, in particular the first and the second connector component, accordingly can comprise the corresponding connections in order for the lines of the cable to be connected to the corresponding connections e.g. of a BTE-component of the hearing device.

In an embodiment, the sealing element is entirely formed from the resilient material. This has the advantage that the sealing element has a simply constructive design and can be easily produced e.g. by single material molding as a monolithic molded article. In other embodiments, a sealing element which comprises a resilient material and a non-resilient material where the latter one e.g. forms a rigid supporting structure of the sealing element can also be advantageous.

In a further embodiment, the resilient material is operatively connected to said catch at all times and provides said catch with said spring force at all times, i.e. in all connecting states of the hearing device plug connector. As such, the catch and the resilient material can be continuously operatively connected and the operative connection does not need to be established every time the first and the second connector components are connected. In other embodiments, the operative connection between the catch and the resilient material is established when e.g. the first and the second connector component are connected, and is released when they are disconnected. This can e.g. be the case when the sealing element is arranged on another connector component than the catch, i.e. for instance when the sealing element is arranged in the first connector component and the catch is arranged in the second connector component.

Whereas the sealing element can be in indirect contact with the catch, i.e. via another part or component of e.g. the latching mechanism, i the sealing element is in direct contact with the catch in favor of a more simple and compact construction.

In an embodiment, the catch is at least partially embedded in the resilient material of the sealing element. As such, it can be ensured that the catch is in direct contact with the resilient material whereas, at the same time, the sealing element can add support to and/or guide the catch, in particular e.g. a free latching end of the catch. In some embodiments, the catch is partially embedded in the sealing element at all times, i.e. in all connecting states of the hearing device plug connector. In certain embodiments, it can also be the case that the catch gets partially embedded in the sealing element only in the connected state of the first and the second connector component, e.g. in case the sealing element and the catch are arranged on different components of the hearing device plug connector.

It can also be advantageous that the sealing element has a bulge or thickening in a region in which it is operatively connected to the catch. The bulge or thickening of the sealing element allows for increasing an effective spring force whereas other parts of the sealing element which mainly function as a seal can be comparatively thin. Alternatively, a thinning in this region may allow for reducing a spring load which may also be advantageous e.g. depending on the type of resilient material used.

In an embodiment, the first connector component is insertable into the second connector component in a single linear motion along a plug-in direction. The plug-in direction or plugging direction corresponds to the direction in which the first connector component is to be inserted into the second connector component in order to establish the plug connection. A single linear motion has the advantage that the plug connector can easily be plugged-in by a single and simple manipulation by the user. In some examples, the plugin direction is axial in the sense that it follows a main axis of the first and/or second connector component. The main axis can e.g. be defined by a longitudinal axis of a (e.g. cylindrical) body of the first and/or the second connector component.

In an embodiment, the catch is elongate and has a free longitudinal latching end as well as an opposing longitudinal attachment end at which it is attached to the first or second connector component. The attachment end may be attached in an articulated manner to the respective connector component in which the catch is arrange, but can also be fixedly attached.

In some examples, the elongate catch extends essentially in parallel to the plug-in direction of the hearing device plug connector. As such, the extension of the catch follows the natural direction of motion when the first and the second connector components are connected and can be easily moved.

In another embodiment, the catch is rotatably attached to the first or the second connector component. A rotatable attachment has the advantage that the catch by itself can be essentially freely pivotable and does not contribute any resilience by itself as it could be the case in e.g. a fixed attachment at the attachment end. Essentially, in the case of rotatable attachment, the only resilience contributing to the spring force on the catch is provided by the resilient material of the sealing element. As such, the resulting effective spring force can be comparatively simply controlled and set to a desired value by e.g. choice of type and/or thickness of the resilient material of the sealing element. In order to achieve the rotatable attachment, the catch can be attached in an articulated manner to the respective component of the hearing device plug connector, i.e. e.g. to the first or the second connector component. In particular, the catch can be attached to the respective component of the hearing device plug connector by e.g. a swivel joint which allows it to swivel about a geometrical swivel axis. The geometrical swivel axis of the articulation may be perpendicular to the plugging direction.

Alternatively, the catch can be fixedly attached to the respective connector component and can have e.g. a free end which is moveable from the latching position into the release position by bending the catch. In this case, however, the resilience of the catch itself would add to the spring force which may render it more difficult to control the resulting effective spring force and/or to provide a reliable and reproduceable spring force.

In some embodiments, the catch can be arranged in the first connector component and the complementary latch component is arranged in the second connector component. In an embodiment, the sealing element is arranged in the first connector component. In this case, the sealing element and the catch can be arranged in the same connector component. In some examples, the first connector component is a socket component and the second connector component is a plug component. In some examples, the socket component comprises a receptacle for receiving the plug component, which has an opening through which the plug component is insertable into the receptacle. The sealing element in this case may be arranged at the opening in such a manner that it forms a continuous seal entirely encompassing the opening. The sealing element in this case may form an inner ring inside the receptacle at the opening with a sealing surface facing the inside of the receptacle. An inner contour of the sealing element corresponds to an outer contour of a cross section of the plug component such that the sealing element can rest with the sealing surface against an outer surface of the plug component in the plugged-in state of the plug connector.

In some examples, the sealing element comprises a sealing lip. The sealing lip provides for a defined abutment against one of the plug connector components, i.e. against the first or the second connector component. When the sealing element is arranged in the socket component, the sealing lip may be configured and arranged in such a manner that it lies against an outside surface of the plug component in a sealing manner when the plug and the socket component are connected, i.e. fully plugged in. The sealing lip may comprise a sealing surface for a defined abutment. Alternatively, when the sealing element is arranged on the plug component, the sealing element can be embodied e.g. as an outer ring encompassing a (e.g. cylindrical) body of the plug component. In this case, the sealing lip and the sealing surface is typically oriented outwardly with respect to the plug-in direction such that it can abut in a sealing manner against the inside surface of the receptacle of the socket component.

The latching mechanism comprises the catch and the complementary latch component. The catch as well as the complementary latch component may thereby comprise a structure that forms an undercut in the plugging direction such that the undercuts can engage and result in the latching engagement. Such undercuts in the plugging direction can be provided by e.g. steps or protrusions. Numerous other types of matching means that can be brought into the latching engagement are known and readily available to the person skilled in the art. In an embodiment, the catch comprises a nose and the complementary latch component comprises a notch with which the nose can be brought into the latching engagement. The notch has the advantage that it can accommodate the nose of the catch in the latching engagement. Typically, the nose is configured at a free end of the moveable catch whereas the notch may be fixedly arranged on the respective connector component. In an embodiment, the nose protrudes from the catch in a direction to where the notch is located in the plugged-in state of the hearing device plug connector and, correspondingly, the notch faces a direction to where the nose is located. Alternatively, the notch is arranged on the catch whereas the complementary latch component comprises the nose.

In some examples, the catch and the complementary latch component are arranged and configured with respect to each other such that the catch can be moved out of the latching position against the spring force into the release position by interaction with the complementary latch component when connecting or disconnecting the first connector component and the second connector component, i.e. when plugging-in or unplugging the hearing device plug connector. To this end, the catch as well as the complementary latch component can have surfaces that function as control surfaces or cams which come into contact when the first and the second connector component are connected or disconnected. The control surfaces are configured such that the catch can be moved or forced out of the latching position and into the release position due to the interaction of the control surfaces. Different control surfaces can come into contact when connection or disconnecting the first and the second connector component which can provide for different threshold forces that need to be overcome in order to move the catch into the release position when unplugging the plug connector as compared to when plugging it in.

Described herein is a hearing device, in particular a hearing aid, including a hearing device plug connector as described herein. In an embodiment, the hearing device comprises a behind-the-ear (BTE) component and an in-the-ear (ITE) component. In some examples, the BTE-component and the ITE-component are detachably connectable by the hearing device plug connector. The ITE-component thereby includes a receiver, i.e. the hearing aid belongs to the group of receiver-in-canal (RIC) devices, in which the receiver is arranged in an earpiece of the ITE-component for insertion into the auditory canal of a user.

In some examples, the first connector component is a part of the BTE-component and the second connector component is a part of the ITE-component. This is particularly advantageous in the case where the first connector component is a socket component and the second connector component is a plug component. This is particularly advantageous in the case where the BTE-component comprises a housing and the first connector component is arranged in said housing, and where the ITE-component comprises a cable and the second connector component is arranged on said cable. The cable can be a fixedly integrated part of the ITE-component. i.e. it is e.g. fixedly connected to an earpiece of the ITE-component, the earpiece including a receiver. However, it can also be advantageous to also or only have a hearing device plug connector for connecting the cable to the earpiece of the ITE-component. In this case, a hearing device including a hearing device plug connector comprises at least an ITE-component with an earpiece, including the receiver, and a cable, wherein the earpiece and the cable are detachably connectable by the hearing device plug connector.

Figure 1B:
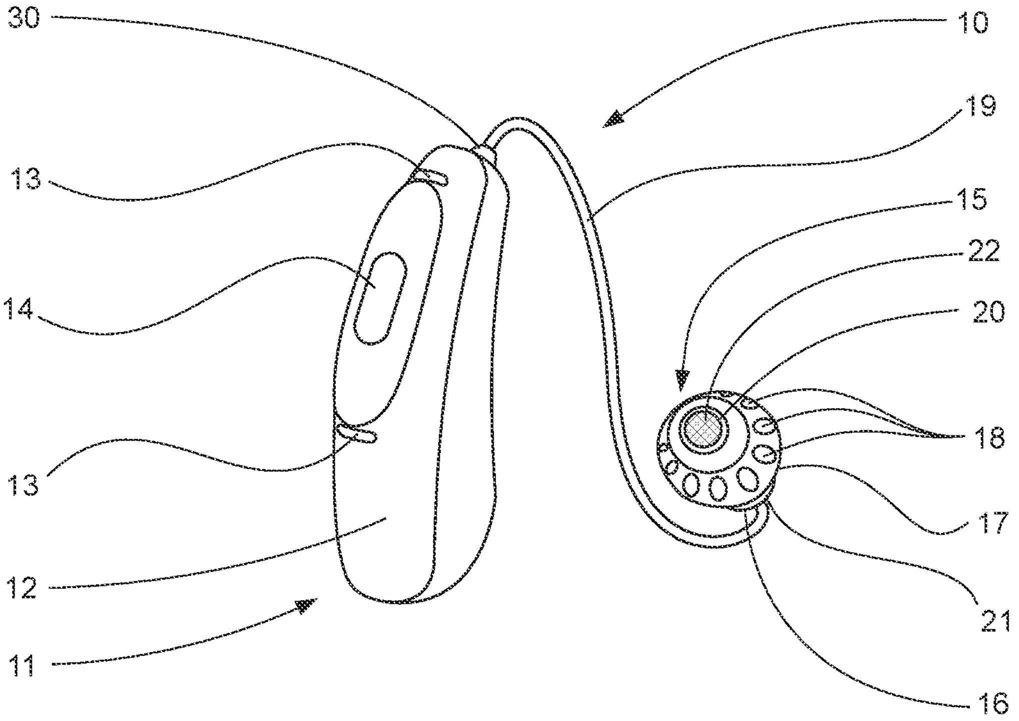
FIG. 1*b*: the hearing aid of FIG. 1*a* in a perspective view.

FIG. 1*a* show s a representation of a hearing device in the form of a hearing aid 10 including a hearing device plug connector 30 in some embodiments as it is worn by a user in a partially cross-sectional view in a frontal plane of the head. The hearing aid 10 comprises a behind-the-ear (BTE) component 11 and an in-the-ear (ITE) component 15. FIG. 1*b* shows the hearing aid 10 in a perspective view. FIGS. 1*a* and 1*b* are described together in the following.

The BTE-component 11 comprises a housing 12 or shell which has a slightly curved anatomic outer shape so as to be comfortably worn behind an ear 23. The BTE-component 11 is usually retained behind the ear 23 in such a manner that a large part of the BTE-component 11 is located between a skull 27 and an ear pinna 24 of the user.

The ITE-component 15 comprises an earpiece 16 for acoustically and physically coupling the hearing aid 10 to the ear 23 of the user. The earpiece 16 is at least partially placed in the auditory canal 25 of the ear 23 as shown in FIG. 1*a*. The earpiece 16 of the hearing aid 10 comprises a seal 17 which in the present embodiment forms a tip or a dome.

The seal 17 is typically made from a soft elastic material which allows comfortable accommodation of the earpiece 16 in the auditory canal 25. The seal 17, on the one hand, allows for a secure seat of the earpiece 16 in the auditory canal 25. On the other hand, the seal 17 also allows for a controlled acoustic coupling of the hearing aid 10 to the auditory canal 25. The seal 17 as shown in FIG. 1*a* can comprise a number of small vent openings 18. Such vent openings 18 allow the auditory canal 25 to be in controlled communication with the ambient air in order to e.g. reduce occlusion effects: by number and size of the vent openings 18, a controlled leakage or level of communication with the ambient air can be achieved, Other embodiments of earpieces can also comprise seals in the form of an earmold, i.e. molded shapes that are custom fit to the ear 23 and the outer section of the auditory canal 25 of the respective user.

The housing 12 of the BTE-component 11 typically accommodates diverse functional components of the hearing aid 10. The housing 12 in the present case accommodates two microphones 13 which allow for e.g. beam forming. Furthermore, the housing 12 encloses a signal processing circuitry (not shown) configured to receive an electrical input signal from the microphones 13 and to provide a processed electrical output signal to a receiver 21, i.e. an electroacoustic transducer for converting the processed electrical output signal to an acoustic signal which can be delivered to a tympanic membrane 26 of the user's ear 23. The receiver 21 in the present case is located in the earpiece 16. In order to provide the electrical components of the hearing aid 10 with power, the housing 12 usually has a receptacle for receiving a replaceable battery or accommodates a rechargeable accumulator (not shown). Furthermore, the housing 12 can comprise a slider and/or a switch 14 for providing the processing circuitry with manual user inputs as e.g. changing the amplification or other settings of the hearing aid 10.

The earpiece 16 is connected to the BTE-component 11 by a cable 19. The cable 19 is connected via the plug connector 30 to the BTE-component 11. The plug connector 30 is further described in the following.

As mentioned in the above, the receiver 21 in the present case is located in the earpiece 16 of the hearing aid 10 as shown in FIGS. 1*a* and 1*b*. Such a configuration is commonly referred to as 'receiver-in-canal' (RIC) which, in combination with the depicted embodiment including the BTE-component 11, is also referred to as BTE-RIC configuration. The cable 19 in this case comprises electrical lines connecting the receiver 21 to output terminals of the signal processing circuitry of the BTE-component 11. The receiver 21 can thus be supplied by the BTE-component 11 via the cable 19 with said processed electrical output signal.

In alternative embodiments (not shown), the receiver 21 can be located in the housing 12 of the BTE-component 11. In this case, the cable 19 can comprise a channel which serves as a sound line for conducting the acoustic signals from the receiver 21 to the earpiece 16. In both cases, be it with the receiver 21 in the BTE-component 11 or in the earpiece 16, acoustic signals resulting from the conversion of the abovementioned processed electrical output signal by the receiver 21 are ultimately delivered to the auditory canal 25 via the earpiece 16, in particular via a sound opening 20 in the seal 17 of the earpiece 16. The sound opening 20 can comprise an ear wax filter 22 to protect e.g. the receiver 21 or a channel of the cable 19 against ingress of ear wax.

Figure 2A:
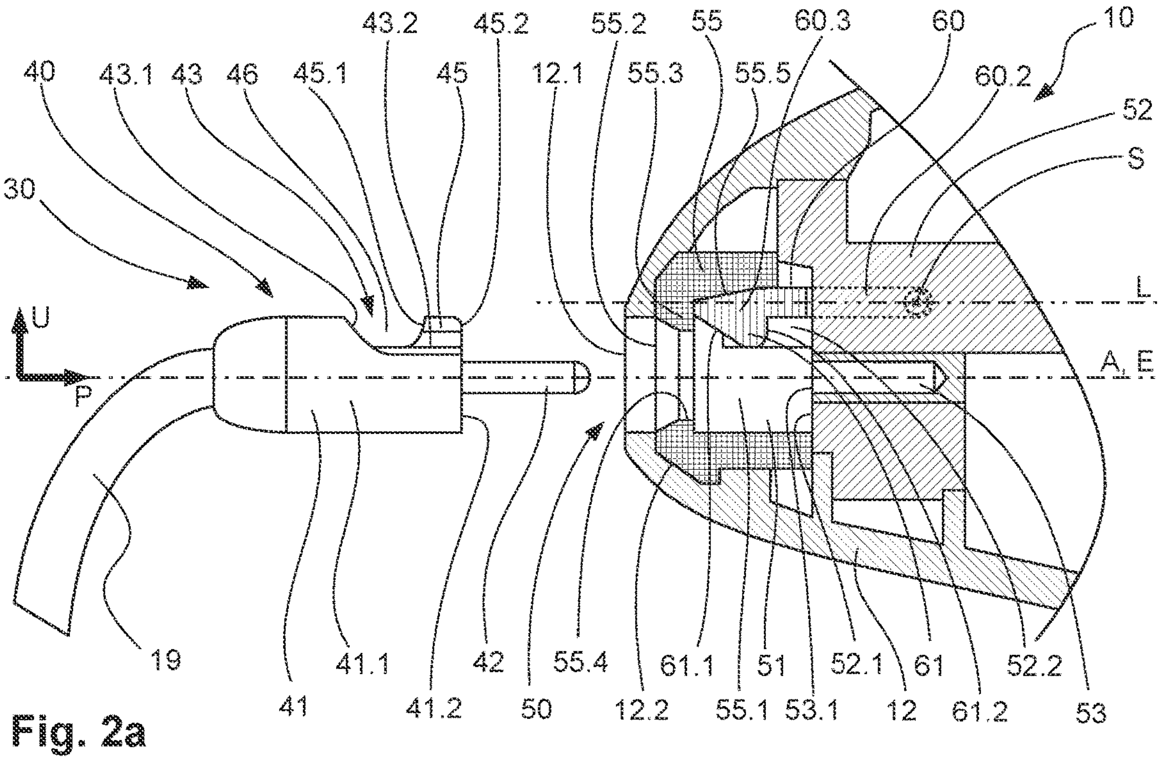
FIG. 2*a*: a partial sectional view of the hearing aid of FIGS. 1*a* and 1*b* in an area where the cable connects to the BTE-component with the hearing device plug connector in an unplugged state.
Figure 2B:
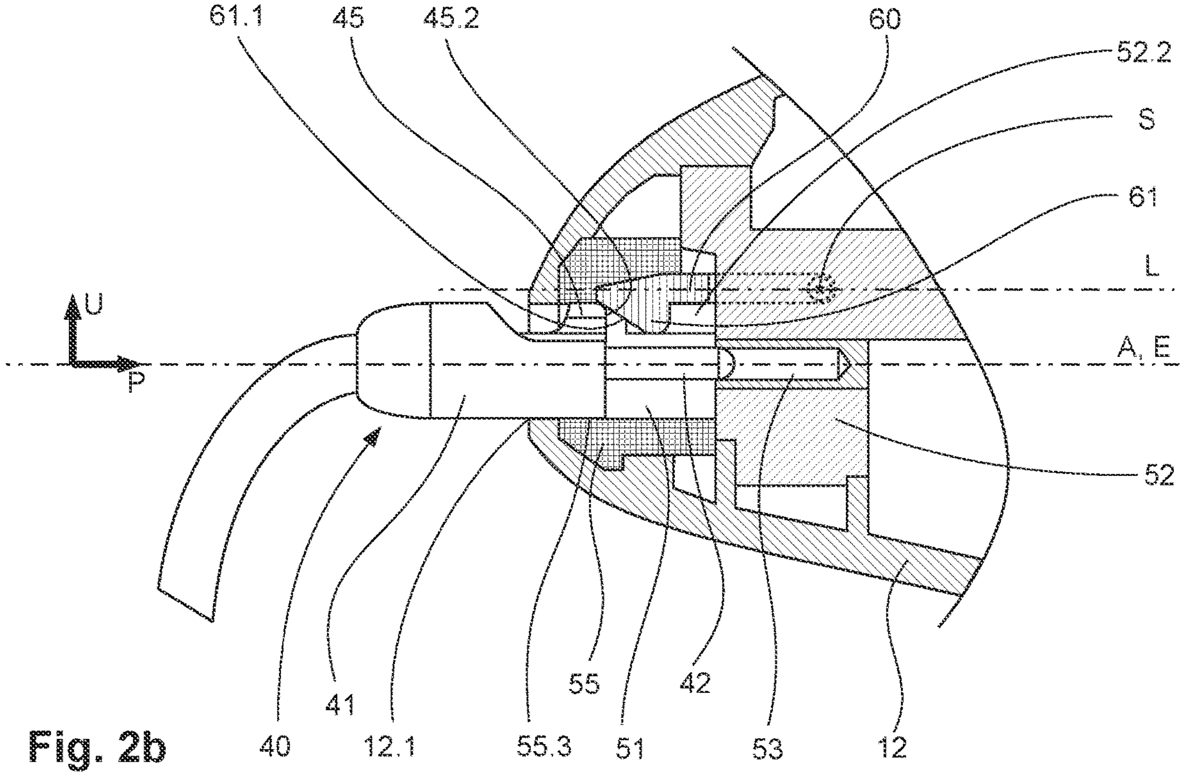
FIG. 2*b*: a partial sectional view of the hearing aid of FIG. 2*a*, wherein a plug component of the hearing device plug connector is partially inserted into a socket component of the plug connector.
Figure 2C:
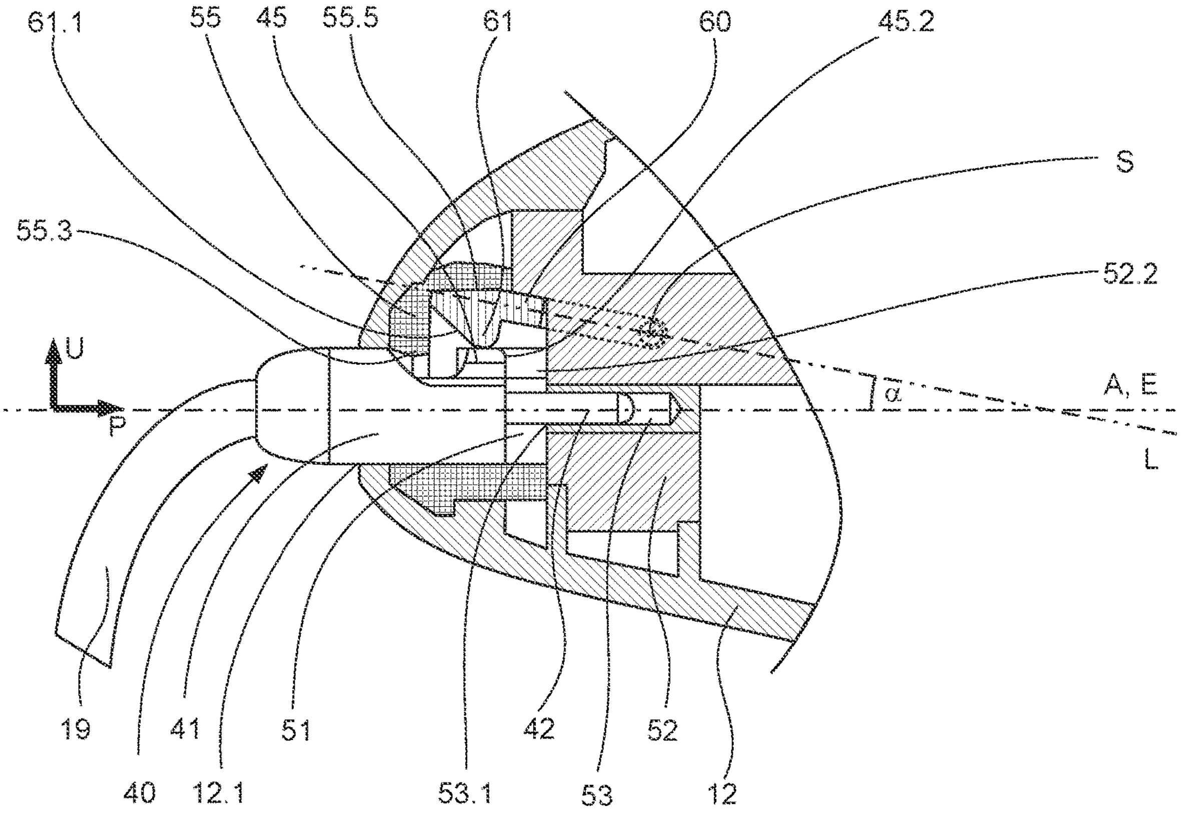
FIG. 2*c*: a partial sectional view of the hearing aid of FIG. 2*a*, wherein the plug component is further inserted into the socket component and a catch of a latching mechanism is in a release position.
Figure 2D:
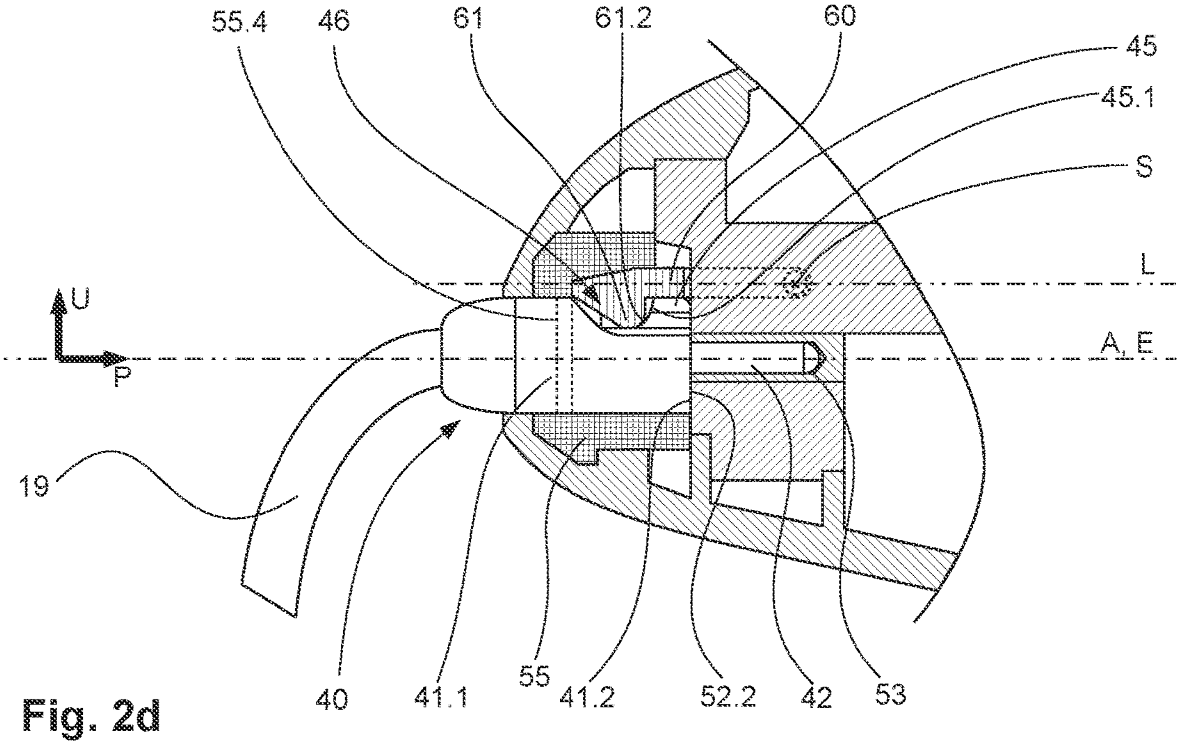
FIG. 2*d*: a partial sectional view of the hearing aid of FIG. 2*a*, wherein the plug component is fully inserted into the socket component and the catch and a complementary latch component are in latching engagement.
Figure 2E:
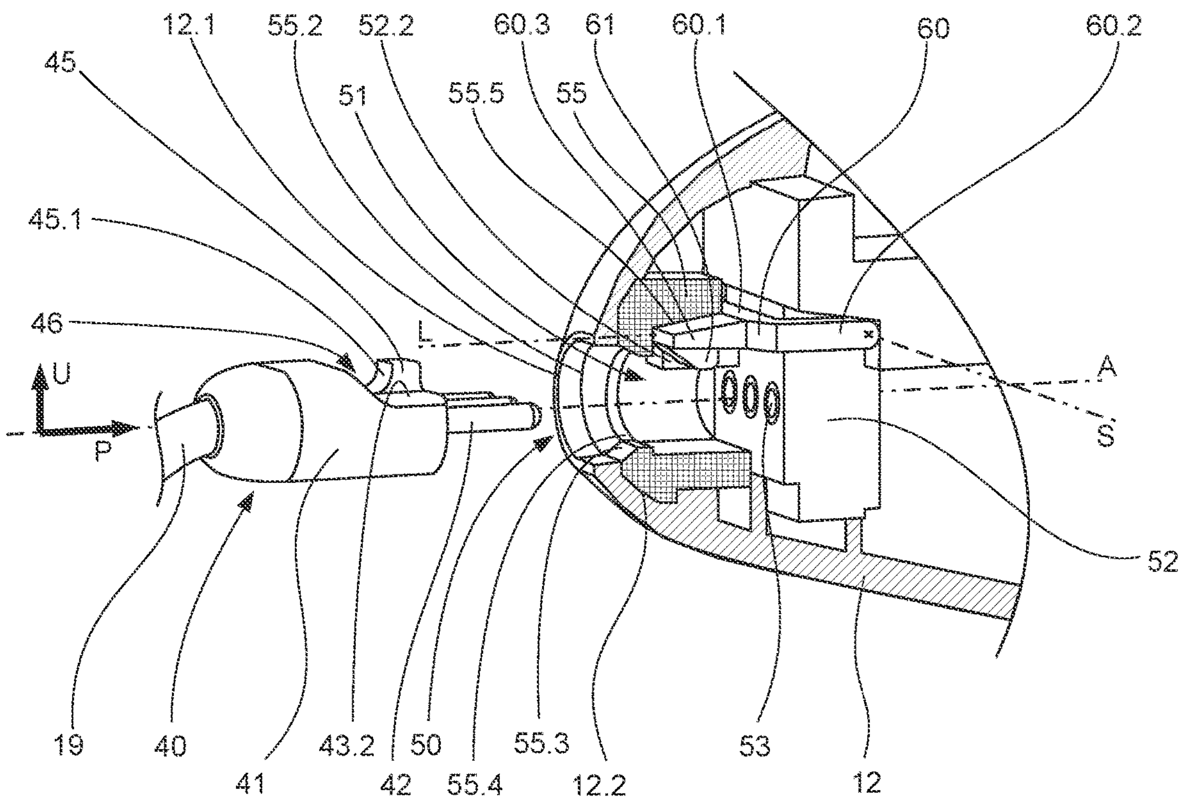
FIG. 2*e*: a partial perspective cutaway view of the hearing aid of FIG. 2*a* in the unplugged state.

FIG. 2*a* depicts a schematic partial cross sectional view of the hearing aid 10 in an area where the cable 19 connects to the BTE-component 11 via the plug connector 30. The plug connector 30 is in an unplugged state in FIG. 2*a*. FIGS. 2*b* to 2*c* show the plug connector 30 in two different intermediate states during plugging-in whereas FIG. 2*d* shows the plug connector 30 in a fully plugged-in state. FIG. 2*e* shows a partial perspective cutaway view of the hearing aid 10 in the unplugged state as shown in FIG. 2*a*. FIGS. 2*a* to 2*e* are described together in the following.

The plug connector 30 comprises a plug component 40 and a socket component 50. The plug component 40 is arranged at a longitudinal end of the cable 19 of the ITE-component 15 (not completely shown in FIG. 2*a*) and is shown in an outside plan view. The socket component 50 is arranged in the housing 12 of the BTE-component 11 and is shown in a cross sectional view.

The socket component 50 is arranged in the housing 12 of the BTE-component 11. The socket component 50 comprises a receptacle 51 which is defined/limited by several components of the BTE-component 11. The receptacle 51 has an essentially cylindrical shape with a longitudinal axis along which is defined a plugging direction P, i.e. the direction in which the plug component 40 is to be inserted into the socket component 50. The receptacle 51 is accessible through an outside opening 12.1 in the housing 12. The opening 12.1 has a contour which has a shape that essentially corresponds to the outer contour of the flattened cross section of the cylindrical base section 41.1 of the base body 41, including a tolerance that avows for comfortable insertion of the plug component 40 through the opening 12.1.

The plug component 40 has an elongate base body 41 with a longitudinal axis A. The base body 41 has an essentially cylindrical base section 411 with a flattened lateral cross section (see e.g. FIG. 2*e*). The cable 19 enters the base body 41 at a rear end in direction of the longitudinal axis A. At a forward end, the base body 41 has a front face 41.2 which is essentially perpendicular to the longitudinal axis A. Three electrical contact pins 42 protrude from the front face 41.2 in parallel with the direction A in a direction, in which the plug component 40 is to be inserted into the socket component 50, i.e. in the plugging direction P. Herein, formulations like 'forward end' and 'forward' refer to directions in the plugging direction P, whereas formulations like 'rear end' or 'rearward' refer to directions opposite to the plugging direction P, unless stated otherwise.

The contact pins 42 are each individually connected to three corresponding electrical lines in the cable 19 (not shown). The contact pins 42 are arranged in a plane E comprising the longitudinal axis A and extending perpendicular to the drawing plane of FIGS. 2*a* to 2*d*. In a forward area, the base body 41 has a cut-away region 43. The cut-away region 43 extends across the whole base body 41 in a direction parallel to the plane E and perpendicular to the longitudinal axis A. The cut-away region 43 reduces a diameter of the base body 41 in this region in a direction U perpendicular to the plane E and defines a flattened area 43.2 which lies essentially parallel to the plane E and is offset to the plane E. The cut-away region 43 is limited in the rearward direction by a rear end surface 43.1. In a forward region of the flattened area 43.2, i.e. at the front face 41.2, a protrusion 45 extends in the direction U which is oriented perpendicular to the plane E, pointing away from the plane E. For the sake of simplicity, the direction U is referred to as 'up' or 'upward' herein.

The protrusion 45 has a forward facing surface 45.2 which transitions smoothly into the front face 41.2 of the plug component 40. A notch 46 is formed between the protrusion 45 and the rear end surface 43.1 of the cut-away region 43. The notch 46 is limited in longitudinal direction A by a partially curved rearward facing surface 45.1 of the protrusion 45 and by the forward facing rear end surface 43.1 of the cut away region 43. In a direction opposite to U, the notch 46 is limited by the flattened area 43.2 whereas it is open in the direction of U, i.e. in an upwards direction, pointing away from the plane E.

Inside the housing 12 of the BTE-component 11, a support structure 52 is arranged which serves as a carrier structure for supporting diverse components of the BTE-component 11. The support structure 52 is to be understood as an exemplary component which can be embodied very differently depending on the particular construction of the hearing aid. The support structure 52 in the present case also provides for parts of the socket component 50. The support structure 52 has a front face 52.1 facing opposite the plugging direction P. The front face 52.1 of the support structure 52 limits the receptacle 51 in the plugging direction P and provides a stop and/or resting surface for abutment of the front face 41.2 of the plug component 40 in the fully plugged state of the plug connector 30.

Three electrical contact sockets 53 are arranged in the support structure 52 having insertion openings 53.1 at the front face 52.1. Each of the contact sockets 53 has a receptacle for receiving one of the contact pins 42 of the plug component 40. The contact sockets 53 are arranged in the same plane E as the contact pins 42 when the plug component 40 is aligned for insertion into the socket component 50. The contact pins 42 and the contact sockets 53 form connections of the plug component 40 and the socket component 50, respectively, that are individually connected when the plug connector 30 is fully plugged in.

A sealing element 55 is arranged inside the housing 12 at the opening 12.1. The sealing element 55 as depicted is made from a resilient material as a whole and allows for elastic deformation. The sealing element 55 encloses an essentially cylindrical receiving space 55.1 which extends in the plugging direction P through the sealing element 55 for receiving the plug component 40. The receiving space 55.1 essentially provides for the receptacle 51 of the socket component 50 and is fully enclosed or encompassed by the sealing element 55 in radial direction with respect to the direction P. At the opening 12.1 of the housing 12, the sealing element 55 has a matching opening 55.2 which provides access to the receiving space 55.1. At the opening 55.2, the sealing element 55 comprises a circumferential sealing lip 55.3 which protrudes radially inward with respect to the longitudinal direction A. The sealing lip 55.3 has a sealing surface 55.4 for a controlled sealing abutment of the sealing element 55 against an outer mantle surface of the base body 41 of the plug component 40 in the plugged-in state of the plug connector 30.

The sealing element 55 in the present embodiment extends in the plugging direction P from the opening 12.1 of the housing 12 up to the front face 52.1 of the support structure 52 against which it abuts. At the opening 12.1, the housing 12 has a receptacle on the inside providing for a form and/or force fitting seat 12.2 of the sealing element 55 inside the housing 12.

The plug connector 30 may comprise a latching mechanism for securing the plug component 40 and the socket component 50 against unintended disconnection. The latching mechanism comprises a catch 60 which is arranged inside the housing 12 and is attached to the support structure 52 in an articulate manner which will be described in more detail below. The latching mechanism also comprises the notch 46 of the plug connector 40 which forms a complementary latch component of the latching mechanism for latching engagement with the catch 60.

The catch 60 has U-shaped base body with a transverse base 60.1 (see FIG. 2*e*) and two laterally arranged arms 60.2 extending from the transverse base 60.1 in the plugging direction P. A latching arm 60.3 extends from a center of the transverse base 60.1 in a direction opposite the plugging direction P towards the opening 55.2 of the sealing element 55 and the opening 12.1 of the housing 12. The transverse base 60.1, the laterally arranged arms 60.2 and the latching arm 60.3 are arranged in a common plane. The latching arm 60.3 defines a longitudinal direction L of the catch 60 which lies parallel to the plane E and the longitudinal direction A when the catch 60 is in a latching or resting position as shown in FIG. 2*a*.

The latching arm 60.3 extends along the receptacle 51 and reaches into a longitudinal recess 55.5 in the sealing element 55. The recess 55.5 is formed such that the latching arm 60.3 is embedded in the sealing element 55 with an upper side, i.e. with a side that faces away from the plane E in the direction of U. The latching arm 60.3 is thus in direct contact with the sealing element 55.

The latching arm 60.3 essentially extends from the front face 45.2 of the support structure 45 up to the sealing lip 55.3 of the sealing element 55 in a direction opposite to the plugging direction P. The sealing lip 55.3 is thus continuous and remains uninterrupted in the circumferential direction.

The latching arm 60.3 comprises a nose 61 protruding essentially perpendicular form the latching arm 60.3 in a direction opposite to the direction U, i.e. towards the plane E when the catch 60 is in the latching or resting position. The nose 61 thus protrudes into the receptacle 51 and is arranged and configured such that it interferes with the path of the protrusion 45 of the plug component 40 when the plug component 40 is inserted into the socket component 50 (see FIGS. 2*b* and 2*c*). The nose 61 has a slanted surface 61.1 which faces opposite the plugging direction P and a partially curved further surface 61.2 which faces in the plugging direction P. The surface 61.1 is slanted in such a manner that a distance from the plane E is larger in a region closer to the opening 55.2 than it is in a region closer to the front face 52.1 of the support structure 52.

The catch 60 is attached in an articulated manner to the supporting structure 52 at free ends of the laterally arranged arms 60.2. The laterally arranged arms 60.2 encompass the support structure 52 on lateral sides and have pins (not shown) at their ends which engage in a transverse direction with bearing recesses (not shown) in the support structure 52. As such, the catch 60 is rotatably attached to the support structure 52 and can swivel about a transverse geometrical axis S. The transverse swivel axis S is oriented perpendicular to the longitudinal directions A and L and lies parallel to the plane E.

In the latching/resting position as shown in FIG. 2*a*, the catch 60 rests against a stop element 52.2 of the support structure 52 which prevents the catch 60 from swiveling further towards the plane E. The catch 60 is thus retained in the latching or resting position between the sealing element 55 and the stop element 52.2. The resilient material of the sealing element 55 thereby provides a spring force that forces the catch 60 against the stop element 52.2.

FIG. 2*b* shows the plug component 40 in a state in which it is partially inserted into the socket component 50. In particular, the main body 41 has been partially inserted through the opening 12.1 of the housing 12 and the opening 55.2 of the sealing element 55 into the receptacle 51. The main body 41 has thereby encountered the sealing lip 55.3 which is pushed essentially radially outward with respect the plugging direction P.

The partially inserted state of FIG. 2*b* depicts the plug component 40 in an intermediate state in which the front facing surface 45.2 of the protrusion 45 comes into contact with the surface 61.1 of the nose 61 of the catch 60. The catch 60 is still in the latching or resting position, i.e. the catch 60 has not been moved out of the latching or resting position and the longitudinal direction L is still oriented in parallel to the direction A and the plane E.

A front section of the main body 41 which is arranged in the receptacle 51 and is surrounded by the sealing element 55 in a radial direction with respect the longitudinal direction A or the plugging direction P. At the same time, the contact pins 42 are partially inserted into the contact sockets 53 through their openings 53.1.

FIG. 2*c* shows the plug component 40 in a state in which it is further inserted into the socket component 50 as compared to FIG. 2*b*. Due to the insertion motion in the direction of P, the protrusion 45 has forced the catch 60 to swivel about the swivel axis S out of the latching or resting position and into a release position. In particular, the front facing surface 45.2 of the protrusion slides on the slanted surface 61.1 of the nose 61 which in turn is lifted in the direction of U, away from the plane E. In the state of FIG. 2*c*, the catch 60 is in the release position in which the nose 61 rests on top of the protrusion 45, i.e. on a top surface of the protrusion 45 which is furthest away from the plane E. The plug component 40 can then be pushed further into the socket component 50 and the nose 61 can be brought into latching engagement with the notch 46 as is described further below.

The surface 45.2 and 61.1 thus interact and function as control surfaces or cams controlling the motion of the catch 60 during the plugging-in of the plug component 40. The longitudinal force applied to the plug component 40 along the plugging direction P is converted via the interacting surfaces 45.2 and 61.1 into a force onto the catch 60 in the in the direction of U, away from the plane E. The catch 60 is thus forcedly lifted out of the latching or resting position in a swivel motion about the axis S and is pushed against and into the sealing element 55 in which it is embedded in the recess 55.5. The sealing element 55, as a consequence, is compressed and/or stretched and, due to the resilience of its material, exerts a spring force onto the catch 60 counteracting the swivel motion about S.

The catch 60 is forced upwards by the protrusion 45 until it reaches the release position in which the nose 61 and the protrusion 45 do no longer interfere in the plugging direction P. In the release position, the longitudinal direction L of the catch 60 is no longer oriented in parallel with the direction A or the plane E and encloses an angle with A and E.

During the further insertion of the plug component 40 in the plugging direction P, the nose 61 slides on the top surface of the protrusion 45 until the nose 61 can engage the protrusion 45 and the catch 60 can swivel back into the latching position as shown in FIG. 2*d*. The nose 61 thereby slides with its surface 61.2 onto the surface 45.1 of the protrusion 45 and into the notch 46 while the catch 60 is forced by the spring force of the resilient material of the sealing element 55 out of the release position and back into the latching position. When the nose 61 is fully engaged with the protrusion 46, the latching mechanism of the plug connector 30 is in the latching engagement and secures the plug component 40 against unintended disconnection, i.e. unintended unplugging of the plug connector 30. The protrusion 45 thus provides for an undercut in a direction opposite to the plugging direction P with which the nose 61 of the catch 60 engages in the latching engagement.

In the plugged-in state as shown in FIG. 2*d*, the plug component 40 is fully inserted into the socket component 50 and the front face 41.2 of the plug component 40 rests against the front face 52.2 of the support structure 52. The contact pins 42 are fully inserted into the contact sockets 53. The sealing lip 55.3 of the sealing element 55 is compressed and rests with its sealing surface 55.4 (dashed lines) against the cylindrical base section 41.1 of the main body 41 of the plug component 40. The sealing element 55 thus provides for a continuous seal encompassing the whole plug component 40. The catch 60 is held in the latching position by the resilient material of the sealing element 55. In some examples, the catch 60 in the latching position also rests against stop element 52.2.

The surfaces 61.2 and 45.1 have essentially complementary curved sections wherein the curved section of surface 45.1 has a concave curvature and the curved section of surface 61.2 has a convex curvature. With increasing distance from the plane E, the curved sections of surfaces 61.2 and 45.1 transition into sections which are comparatively steep relative to the plane E, i.e. almost perpendicular to the plane E. The surface 45.1 in particular has a slope which is slightly tilted away from a direction perpendicular to the plane E into the plugging direction P to facilitate disconnection of the plug connector 30, i.e. facilitate the nose 61 sliding out of the notch 46. Due to interaction of the surfaces 61.2 and 45.1, the catch 60 is forced out of the latching engagement, i.e. is lifted out of its latching position and into the release position, when the plug component 40 is pulled-out of the socket component 50 in a direction opposite to the plugging direction P, i.e. when unplugging the plug connector 30. The surfaces 61.2 and 45.1 thereby interact and function, similar to the surfaces 45.2 and 61.1 during the plugging-in of the plug component 40, as control surfaces or cams controlling the motion of the catch 60 during the unplugging of the plug component 40.

In order to move the plug component 40 out of the socket component 50, a pull-out force, i.e. a force in a direction opposite to the plugging direction P needs to be applied to the plug component 40. The close to perpendicular section of surface 45.1 results in a larger force that needs to be overcome for lifting the catch 60 with its nose 61 onto the top surface of the protrusion 45 and into the release position, than when plugging-in the plug component 40. As such, the pull-out threshold force is larger than the plug-in threshold force which is a direct result of the more moderate slope of surface 61.1 of the catch 60 with respect to the plugging direction P as compared to the steeper slope of surface 45.1 of the protrusion 45. The spring load onto the catch 60 provided by the resilient material of the sealing element 55 can thereby remain essentially the same in both cases.

For better illustration, FIG. 2*e* depicts a partial perspective cutaway view of the hearing aid 10 in an unplugged state corresponding to FIG. 2*a*.

Figure 3:
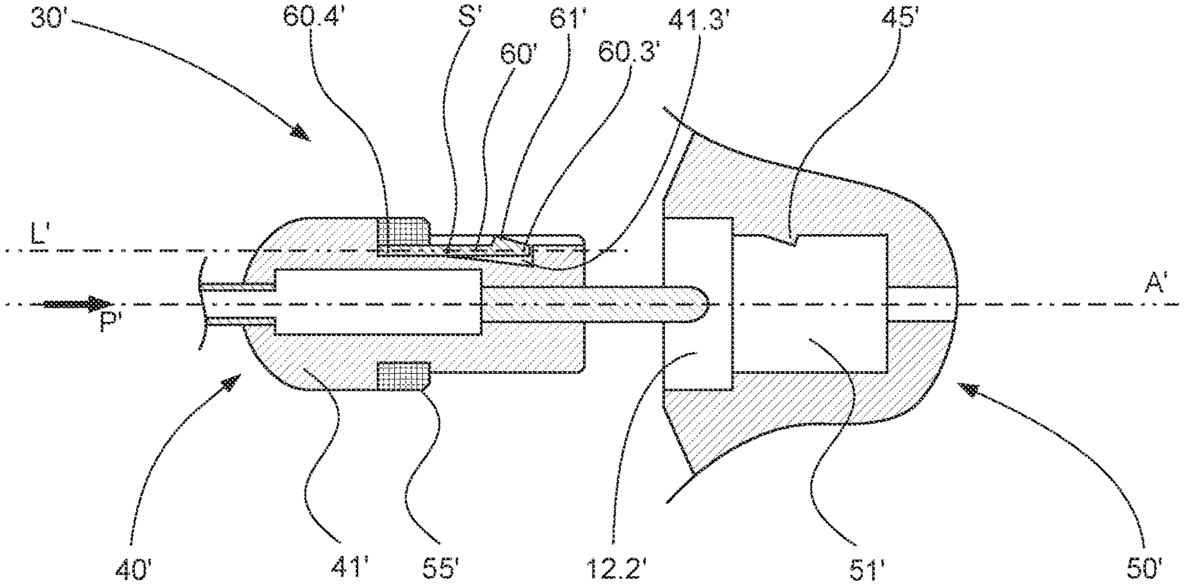
FIG. 3: an further embodiment of a hearing device plug connector, wherein a catch of a latching mechanism and a sealing element are arranged on a plug component of the plug connector.

FIG. 3 shows a cross sectional view of a different embodiment of a hearing device plug connector 30' in some embodiments. In contrast to the embodiment shown in FIGS. 2*a* to 2*d*, a sealing element 55' is arranged on a plug component 40' of the plug connector 30'. The sealing element 55' in this case can be e.g. a resilient O-ring encompassing a base body 41' of the plug component 40'. A catch 60' is arranged in a longitudinal recess 41.3' of the main body 41' of the plug component 40' and is supported in a rocker-like manner on the base body 41'.

The catch 60' has two rocker arms which extend along a longitudinal direction L' in parallel to a longitudinal direction A' of the plug component 40' when the catch 60' is in a latching or resting position. The longitudinal direction A' corresponds to a plugging direction P' of the plug connector 30' when the plug component 40' is arranged to be plugged into a socket component 50' of the plug connector 30'. One rocker arm 60.3' extends in a forward direction, i.e. in a plugging direction P', and the other one 60.4' extends in a rearward direction, i.e. opposite to the plugging direction P', with respect to a fulcrum of the rocker-like catch 60'. The fulcrum thereby defines a pivot axis S' which is oriented perpendicular to the longitudinal direction A' and plugging direction P.

The forward extending rocker arm forms a latching arm 60.3' with a nose 61' at a free end of the latching arm 60.3' which protrudes outwardly, away from the base body 41'. The rearward extending rocker arm 60.4' is arranged between the main body 41' and the sealing element 55'. As such, when the latching arm 60.3' is moved towards the main body 41', i.e. further into the recess 41.3' into a release position, the catch 60' pivots about the axis S' of the fulcrum and the rearward extending rocker arm 60.4' is lifted away from the main body 41'. The longitudinal direction L' of the catch 60' is thus rotated about the fulcrum S' with respect to the direction A'. Thereby, the rearward extending rocker arm 60.4' pushes against and stretches/deforms the sealing element 55'. The resilience of the sealing element 55' thus provides a restoring spring force, forcing the catch 60' back into the latching or resting position. A bottom of the recess 41.3' can thereby act as a stop element against which the rearward extending rocker arm 60.4' is pressed in the latching or resting position.

The socket component 50' has a receptacle 51' for receiving at least part of the main body 41' of the plug component 40'. In an area of an insertion opening of the receptacle 51', a seat 12.2' is provided for receiving the sealing element 55' when the plug component 40' is fully plugged-in. Inside the receptacle 51', a protrusion 45' is provided which protrudes from an outside wall of the receptacle 51' towards the interior of the receptacle 51' and is arranged and configured in such manner that it interferes with the path of the nose 61' of the catch 60' when the plug component 40' is inserted into the socket component 50'.

Due to the interfering paths, the catch 60' is pushed by the protrusion 45' into the recess 41.3' and into its release position during the plugging-in of the plug connector 40'. When fully plugged-in, the nose 61' of the catch 60' engages the protrusion 45' in the plugging direction P', thus forming a latching engagement. The nose 61' and the protrusion 45' thereby have surfaces that act as control surfaces or cams for the movement of the catch 60' during plugging-in and unplugging the plug component 40', similar to the embodiment shown in FIGS. 2*a* to 2*d*.

The embodiment of FIG. 3 thus depicts an alternative hearing device plug connector 30' in which the sealing element 55' and the catch 60' are arranged on the plug component 40'.

Figure 4:
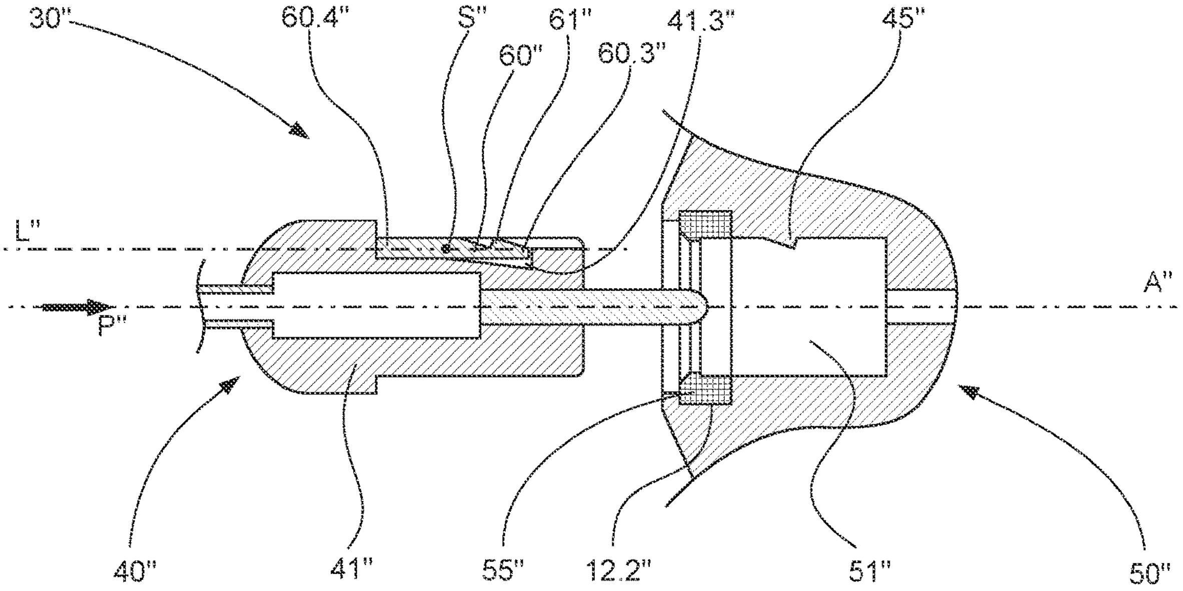
FIG. 4: a further embodiment of a hearing device plug connector, wherein a catch of a latching mechanism is arranged on a plug component of the plug connector and a sealing element is arranged in a socket component of the plug connector.

FIG. 4 shows a cross sectional view of a further embodiment of a hearing device plug connector 30" in some embodiments. In contrast to the embodiment shown in FIG. 3, a sealing element 55" is arranged in a seat 12.2" of a socket component 50" of the plug connector 30", similar to the embodiment shown FIGS. 2*a* to 2*e*.

A catch 60" is arranged in a longitudinal recess 41.3" of the main body 41" of the plug component 40" and is supported in a rocker-like manner on the base body 41", similar to the embodiment of FIG. 3. In contrast to the embodiment of FIG. 3, the catch 60" is not loaded with a spring force when the plug component 40" is in an unplugged state. The catch 60" is arranged with a longitudinal direction L" in parallel to a longitudinal direction A" of the plug component 40" when it is in a latching or resting position.

The socket component 50" has a receptacle 51" for receiving at least part of the main body 41" of the plug component 40". Inside the receptacle 51", a protrusion 45" is provided which protrudes from an outside wall of the receptacle 51" towards the interior of the receptacle 51". The protrusion 45" is arranged and configured in such manner that it interferes with the path of an outwardly protruding nose 61" of the catch 60" when the plug component 40" is inserted into the socket component 50".

Due to the interfering paths, the catch 60" is pushed by the protrusion 45" into the recess 41.3" of the main body 41" and into a release position during the plugging-in of the plug connector 40". The rearward extending rocker arm 60.4" is thereby lifted away from the main body 41" of the plug component 40". In this state of the plugging-in process, the sealing element 55" which is seated in the socket component 50" comes into operative connection with the catch 60" via the rearward extending rocker arm 60.4". The resilience of the sealing element 55" exerts a spring force onto the rearward extending rocker arm 60.4" of the catch 60", forcing the catch 60" to return into its latching or resting position. When fully plugged-in, the nose 61" of the catch 60" engages the protrusion 45" in a latching engagement. The sealing element 55" thereby retains the catch 60" in its latching position.

During unplugging of the plug component 40", the catch 60" can be forced against the spring force provided by the sealing element 55" into its release position due to the interaction with the protrusion 45". During the further pull-out of the plug component 40", the catch 60", in particular the rearward extending rocker arm 60.4", loses contact and, thus, the operative connection with the sealing element 55" which remains seated in the socket component 50".

The embodiment of FIG. 4 thus depicts a further alternative of a hearing device plug connector 30" in which the sealing element 55" is arranged in the socket component 50" whereas the catch 60" is arranged on the plug component 40".

Further embodiments of the hearing device plug connector may be contemplated based on the description herein.

What is claimed is:

1. A hearing device plug connector comprising:

a first connector component and a second connector component which are detachably connectable, wherein the hearing device plug connector includes a latching mechanism for securing the first connector component and the second connector component against unintended disconnection, wherein the latching mechanism includes a catch and a complementary latch component which are in latching engagement when the first connector component and the second connector component are connected, wherein the catch is moveable against a spring force from a latching position into a release position when connecting or disconnecting the first connector component and the second connector component, wherein in the latching position the catch can engage with the complementary latch component and in the release position the catch can disengage from the complementary latch component, the hearing device plug connector comprising a sealing element for providing a seal between the first connector component and the second connector component for protection against contamination of the hearing device plug connector, characterized in that the sealing element includes a resilient material in direct operative connection with the catch and said resilient material provides said catch with said spring force when the catch is moved from the latching position toward the release position such that the catch pushes against the sealing element, wherein the first connector component and the second connector component are connectable in a single linear motion along a plug-in direction of the hearing device plug connector, wherein, when the catch is moved from the latching position toward the release position, the catch moves laterally away from the plug-in direction such that the spring force of the sealing element acts transversally with respect to the plug-in direction.

2. The hearing device plug connector according to claim 1, characterized in that the first connector component and the second connector component each comprise an electrical connection, said electrical connections being connected when the first connector component and the second connector component are connected.

3. The hearing device plug connector according to claim 1, characterized in that the sealing element is entirely formed from the resilient material.

4. The hearing device plug connector according to claim 1, characterized in that the catch is elongate and has a free longitudinal latching end and an opposing longitudinal attachment end at which it is attached to the first connector component or second connector component.

5. The hearing device plug connector according to claim 1, characterized in that the catch is rotatably attached to the first connector component or the second connector component.

6. The hearing device plug connector according to claim 1, characterized in that the catch is arranged in the first connector component and the complementary latch component is arranged in the second connector component, wherein the first connector component is a socket component and the second connector component is a plug component.

7. The hearing device plug connector according to claim 1, characterized in that the sealing element is arranged in the first connector component.

8. The hearing device plug connector according to claim 1, characterized in that the catch comprises a nose and the complementary latch component comprises a notch with which the nose can be brought into the latching engagement.

9. The hearing device plug connector according to claim 1, characterized in that the catch and the complementary latch component are arranged and configured with respect to each other such that the catch can be moved out of the latching position against the spring force into the release position by interaction with the complementary latch component when connecting or disconnecting the first connector component and the second connector component.

10. The hearing device plug connector according to claim 9, characterized in that the catch and the complementary latch component both comprise surfaces which, when connecting or disconnecting the first connector component and the second connector component, interact and function as control surfaces which move the catch from the latching position into the release position.

11. The hearing device plug connector according to claim 1, characterized in that the sealing element is at least partially colored for visual identification by a user.

12. A hearing device comprising a hearing device plug connector according to claim 1.

13. The hearing device according to claim 12, comprising a behind-the-ear (BTE) component and an in-the-ear (ITE) component, wherein the BTE-component and the ITE-component are detachably connectable by the hearing device plug connector.

14. The hearing device according to claim 13, wherein the first connector component is a part of the BTE-component and the second connector component is a part of the ITE-component.

* * * * *